United States Patent
Nii (10) Patent No.: US 10,037,083 B2
(45) Date of Patent: Jul. 31, 2018

(54) MOBILE ELECTRONIC DEVICE AND METHOD

(71) Applicant: KYOCERA Corporation, Kyoto-shi, Kyoto (JP)

(72) Inventor: Hideaki Nii, Yao (JP)

(73) Assignee: KYOCERA CORPORATION, Kyoto (JP)

( * ) Notice: Subject to any disclaimer, the term of this patent is extended or adjusted under 35 U.S.C. 154(b) by 1 day.

(21) Appl. No.: 14/722,640

(22) Filed: May 27, 2015

(65) Prior Publication Data
US 2015/0346831 A1  Dec. 3, 2015

(30) Foreign Application Priority Data
May 28, 2014 (JP) ................................. 2014-109769

(51) Int. Cl.
*G06F 3/041* (2006.01)
*G06F 3/01* (2006.01)
(Continued)

(52) U.S. Cl.
CPC .............. *G06F 3/017* (2013.01); *G06F 3/038* (2013.01); *G06F 3/0482* (2013.01); *G11B 27/00* (2013.01);
(Continued)

(58) Field of Classification Search
CPC .... G06F 3/041; G06F 3/0488; G06F 3/04883; G06F 3/044; G06F 3/04886; G06F 3/045
See application file for complete search history.

(56) References Cited

U.S. PATENT DOCUMENTS

2008/0005703 A1*  1/2008  Radivojevic .......... G06F 1/1626
                                                                                      715/863
2012/0176552 A1     7/2012  Ryu et al.
(Continued)

FOREIGN PATENT DOCUMENTS

JP       2012-146304 A       8/2012
JP       2013-061848 A       4/2013
(Continued)

OTHER PUBLICATIONS

Official Action dated Jul. 18, 2017, in corresponding Japanese Patent Application No. 2014-109769 with Statement of Relevance of Non-English References.
(Continued)

*Primary Examiner* — Nicholas Lee
*Assistant Examiner* — Ngan T Pham Lu
(74) *Attorney, Agent, or Firm* — Duane Morris LLP (57) ABSTRACT

An electronic device and method is disclosed. The electronic device includes a storage module, a recognition module, and a control module. The storage module is configured to store a first and second movement of one or more fingers of a user, and a first and second process. The first movement is different from the second movement. The first process comprises executing an application. The second process is configured to notify information related to the first process. The recognition module is configured to recognize a gesture of one or more fingers as the first movement or the second movement. The control module configured to perform the first process when the gesture is recognized as the first movement. The control module is further configured to perform the second process when the gesture is recognized as the second movement.

14 Claims, 8 Drawing Sheets

(51) Int. Cl.
  *G06F 3/038* (2013.01)
  *G11B 27/00* (2006.01)
  *G06F 3/0482* (2013.01)
  *G11B 27/34* (2006.01)

(52) U.S. Cl.
  CPC ...... *G06F 2203/0381* (2013.01); *G11B 27/34* (2013.01)

(56) References Cited

U.S. PATENT DOCUMENTS

| | | |
|---|---|---|
| 2013/0257720 A1 | 10/2013 | Noda et al. |
| 2013/0331150 A1 | 12/2013 | Butsusaka et al. |
| 2014/0344753 A1* | 11/2014 | Akasaka ............... G06F 3/0488 715/823 |
| 2015/0182160 A1* | 7/2015 | Kim ..................... A61B 5/0488 600/301 |
| 2016/0228633 A1* | 8/2016 | Welsch ................. A61M 5/142 |

FOREIGN PATENT DOCUMENTS

| | | |
|---|---|---|
| JP | 2013-205983 A | 10/2013 |
| JP | 2013-257662 A | 12/2013 |
| JP | 2014-085963 A | 5/2014 |

OTHER PUBLICATIONS

Official Action dated Oct. 24, 2017, in corresponding Japanese Patent Application No. 2014-109769 with Statement of Relevance of Non-English References.

Official Action dated Jan. 23, 2018, in corresponding Japanese Patent Application No. 2014-109769 with Statement of Relevance of Non-English References.

* cited by examiner

MOBILE ELECTRONIC DEVICE AND METHOD

CROSS-REFERENCE TO RELATED APPLICATION

The present application claims priority under 35 U.S.C. § 119 to Japanese Patent Application No. 2014-109769, filed on May 28, 2014, entitled "MOBILE TERMINAL DEVICE, JESTURE CONTROL PROGRAM AND JESTURE CONTROL METHOD". The content of which is incorporated by reference herein in its entirety.

FIELD

Embodiments of the present disclosure relate generally to electronic devices, and more particularly relate to a mobile electronic device with improved operability.

BACKGROUND

A mobile phone may have a touch panel. A user might not be able to touch the touch panel while working in a wet environment, such as at a beach and in a kitchen.

SUMMARY

An electronic device and method is disclosed. In one embodiment, the electronic device includes a storage module, a recognition module, and a control module. The storage module is configured to store a first and second movement of one or more fingers of a user, and a first and second process. The first movement is different from the second movement. The first process comprises executing an application. The second process is configured to notify information related to the first process. The recognition module is configured to recognize a gesture of one or more fingers as the first movement or the second movement. The control module is configured to perform the first process when the gesture is recognized as the first movement. The control module is further configured to perform the second process when the gesture is recognized as the second movement.

In one embodiment, a storage medium stores a program for recognizing a movement. The program comprises instructions for recognizing a gesture of one or more fingers as the first movement or a second movement. A first process to execute an application and a second process notifies information related to the first process. The program further comprises instructions of controlling the first process when the gesture is recognized as the first movement, and controlling the second process when the gesture is recognized as the second movement.

In one embodiment, a method for controlling a mobile electronic device comprises recognizing a gesture of one or more fingers as a first movement or a second movement. A first process executes an application and a second process notifies information related to the first process. The method further comprises controlling the first process when the gesture is recognized as the first movement, and controlling the second process when the gesture is recognized as the second movement.

BRIEF DESCRIPTION OF THE DRAWINGS

FIGS. 6(*a*) and 6(*b*) are illustrations of example embodiments of input operations.

FIGS. 7(*a*) and 7(*b*) are illustrations of example screens for showing a setting of an input operation.

DETAILED DESCRIPTION

Figure 1:
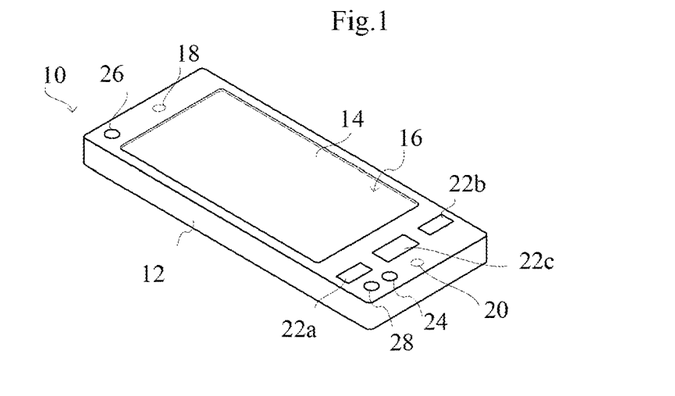
FIG. 1 is an illustration of an external view of an example mobile phone 10.

FIG. 1 is a diagram illustrating an external view of a mobile phone 10 according to an embodiment. Specifically, the mobile phone 10 includes a housing 12, a display 14, a touch panel 16, a speaker 18, a microphone 20, hardware keys 22 such as including 22*a*, 22*b*, and 22*c*, a camera 24, a depth sensor 26, and a depth camera 28.

The housing 12 may include the display 14. The display 14 includes, without limitation, a liquid crystal display or an organic electroluminescence (EL) display but is not limited to these displays. The touch panel 16 is located on, or is part of, the display 14.

The housing 12 may include the speaker 18 and the microphone 20. The housing 12 has a rectangular shape, and the speaker 18 may be located at one end of the housing 12 in the longitudinal direction. The hardware keys 22 may include an off-hook key 22*a*, an on-hook key 22*b*, and a menu key 22*c*.

In one embodiment, the camera 24 may be located to the left of the microphone 20. The depth sensor 26 is located to the left of the speaker 18. The depth camera 28 is located to the left of the camera 24.

In one embodiment, when a user performs a touch operation on a dial pad displayed on the display 14, the mobile phone 10 accepts input of a phone number. When the user operates the off-hook key 22*a*, the mobile phone 10 initiates a voice call. When the user operates the on-hook key 22*b*, the mobile phone 10 ends the voice call. When the user keeps pressing the on-hook key 22*b*, the user can turn on or off of the mobile phone 10.

When the user operates the menu key 22*c*, the display 14 of the mobile phone 10 displays a home screen. When the user performs a touch operation on an object included in the home screen, the object is selected by the mobile phone 10.

When the user performs an operation of making a video call, the mobile phone 10 transmits an image different from mobile phone 10 captured by the camera 24 to the other terminal. The display 14 displays an image captured by the other terminal. In one embodiment, the user can make one or more gesture inputs to control a video call. The mobile phone 10 is able to recognize a gesture input by the depth sensor 26 and the depth camera 28.

The user is able to operate the mobile phone 10 by at least one of touch input, user key input, voice input and gesture inputs. In one embodiment, when the user may input a voice command into the mobile phone 10 to instruct the mobile phone 10 to start to recognize gesture inputs. In one embodiment, for example, when the user says "gesture input", the mobile phone 10 activates gesture input.

The mobile phone 10 may execute applications, such as email, e-books, a music player, and a browser, in addition to voice calls and video calls.

Figure 2:
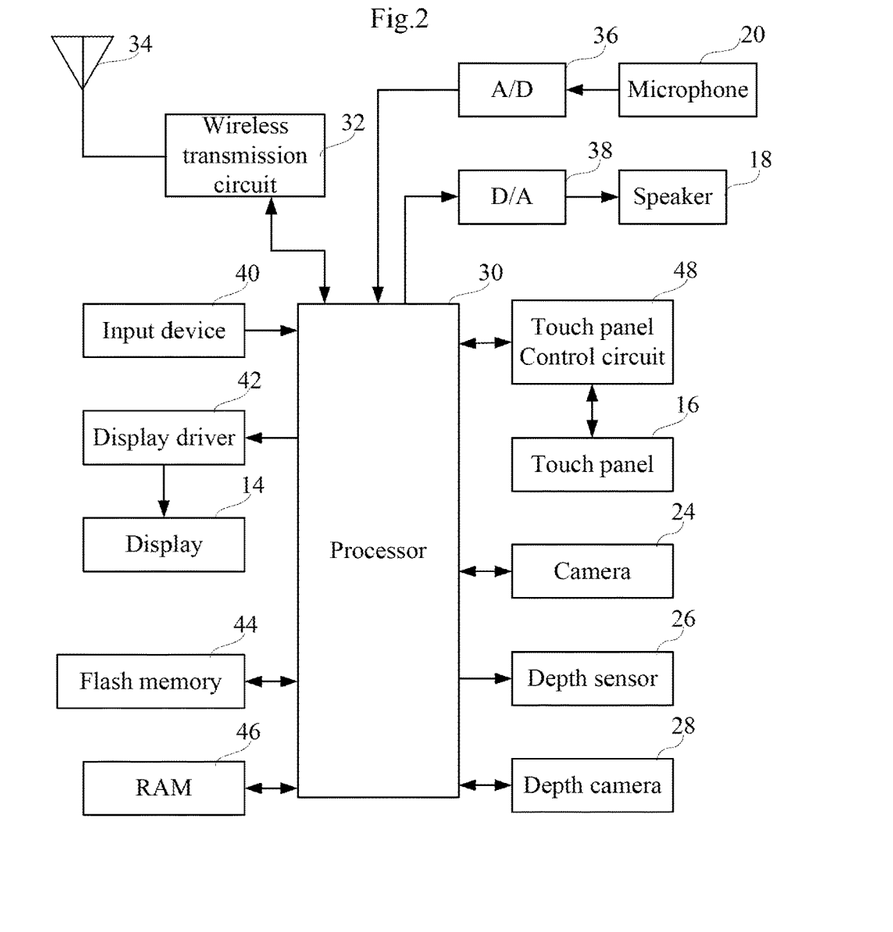
FIG. 2 is an illustration of an electrical configuration of a mobile phone 10.

FIG. 2 is a diagram for describing an example electrical configuration of the mobile phone 10. The mobile phone 10 includes a processor 30, the camera 24, the depth sensor 26, the depth camera 28, a wireless transmission circuit 32, an analog-to-digital (A/D) converter 36, a digital-to-analog (D/A) converter 38, an input device 40, a display driver 42, a flash memory 44, a random access memory (RAM) 46, and a touch panel control circuit 48.

The processor 30 is able to control the mobile phone 10. The processor 30 includes a central processing unit (CPU). The processor 30 uses the RAM 46 as a work area or a buffer area. The processor 30 executes a part of program or the entire program set in advance in the flash memory 44 before executing a program stored in the RAM 46.

The input device 40 includes one or more hardware keys 22. The hardware keys 22 may include the three hardware keys, namely, the off-hook key 22a, the on-hook key 22b, and the menu key 22c as illustrated in FIG. 1. The hardware keys 22 accept one or more user operations performed thereon. Information from the hardware key 22 that has accepted the user operation is input into the processor 30.

An antenna 34 transmits and receives radio signals corresponding to, for example, voice calls and emails. In one embodiment, the wireless transmission circuit 32 performs a call origination process. A call origination process includes originating a voice call to another telephone in accordance with an operation accepted by the touch panel 16. The wireless transmission circuit 32 performs a call origination process in accordance with an instruction provided by the processor 30. The wireless transmission circuit 32 transmits a voice call origination signal to another telephone via the antenna 34, a base station, and a communication network. The wireless transmission circuit 32 may perform radio communication based on, for example, a code division multiple access (CDMA) scheme.

The A/D converter 36 is coupled to the microphone 20. The microphone 20 receives voice input. The A/D converter 36 converts the voice input from the microphone 20 into digital audio data and outputs the digital audio data to the processor 30. The D/A converter 38 is coupled to the speaker 18. The D/A converter 38 converts digital audio data into an audio signal and outputs the audio signal to the speaker 18 via an amplifier. Accordingly, the speaker 18 outputs synthesized voice based on the audio data. The mobile phone 10 transmits voice accepted by the microphone 20 to another telephone when performing call processing. The mobile phone 10 outputs voice accepted by the other telephone from the speaker 18.

The display driver 42 is coupled to the display 14 illustrated in FIG. 1. The display driver 42 may include a video memory. The display driver 42 is able to temporarily store image data output from the processor 30. The display driver 42 displays an image on the display 14 on the basis of the image data stored on the video memory. That is, the display driver 42 controls the display 14 in accordance with an instruction provided by the processor 30. The display 14 includes a backlight. The display driver 42 controls the brightness of the backlight and turns the backlight on or off in accordance with an instruction from the processor 30.

The touch panel control circuit 48 is coupled to the touch panel 16. The touch panel control circuit 48 provides voltage to the touch panel 16. The touch panel control circuit 48 inputs a start signal indicating a start of touching, an end signal indicating an end of touching, and coordinate data indicating the touch position into the processor 30. The processor 30 determines an object that has been touched on the basis of the coordinate data.

In one embodiment, the touch panel 16 includes an electrostatic capacitive touch panel. The touch panel 16 detects the position and the direction of operation by one or more fingers having touched the surface of the touch panel 16. The touch panel control circuit 48 can detect a touch operation on an effective area of the touch panel 16. The touch panel control circuit 48 outputs coordinate data to the processor 30 that indicates a position where the detected touch operation has been performed. That is, in accordance with a touch operation performed by a user on the surface of the touch panel 16, the mobile phone 10 accepts position and direction of the touch operation.

Hereinafter, a contact object is a finger. A touch operation includes a tap operation, a long tap operation, a flick operation, a slide operation, a drag operation and a drop operation. The tap operation includes an operation of touching the surface of the touch panel 16 with a finger and thereafter momentarily releasing the finger from the surface of the touch panel 16. The long tap operation includes an operation of keeping a finger in contact with the surface of the touch panel 16 for a predetermined duration or longer, and thereafter releasing the finger from the surface.

The flick operation includes an operation of touching the surface with a finger and thereafter flicking the finger in a certain direction at a predetermined speed or higher. The slide operation includes moving a finger in a certain direction while keeping the finger in contact with the surface of the touch panel 16 and thereafter releasing the finger from the surface. A drag operation includes touching, with a finger, a position on the display 14 where an object is displayed and moving the finger to move the object. A drag operation may include a drop operation. The drop operation further includes an operation of releasing a finger from the surface of the touch panel 16 after a drag operation.

In a description given below, a tap operation, a long tap operation, a flick operation, a slide operation, a drag operation, or a drop operation may be described without the word "operation". A touch operation may be performed using a stylus pen instead of a user's finger.

The camera 24 may include a camera module, an image sensor, a lens, and a control circuit. The depth sensor 26, the depth camera 28, and the processor 30 constitute a recognition unit.

The depth sensor 26 may include an infrared projector and an infrared camera. The depth sensor 26 emits an infrared laser beam that is operable to draw a specific pattern in space. The depth camera 28 captures an image of the drawn pattern. The processor 30 can analyze the image to obtain depth information.

The processor 30 can recognize a position of a finger on the basis of the depth information. The processor 30 tracks changes in a position of the finger or a movement of the finger, and recognizes a gesture of the finger accordingly. The Kinect (registered trademark) sensor from Microsoft (registered trademark) is an example device that performs the depth information by infrared for recognizing a gesture. The technique relating thereto is widely available, and therefore, a detailed description thereof is omitted here. The depth sensor 26, the depth camera 28, and processor 30 function as a recognition unit.

Figure 3:
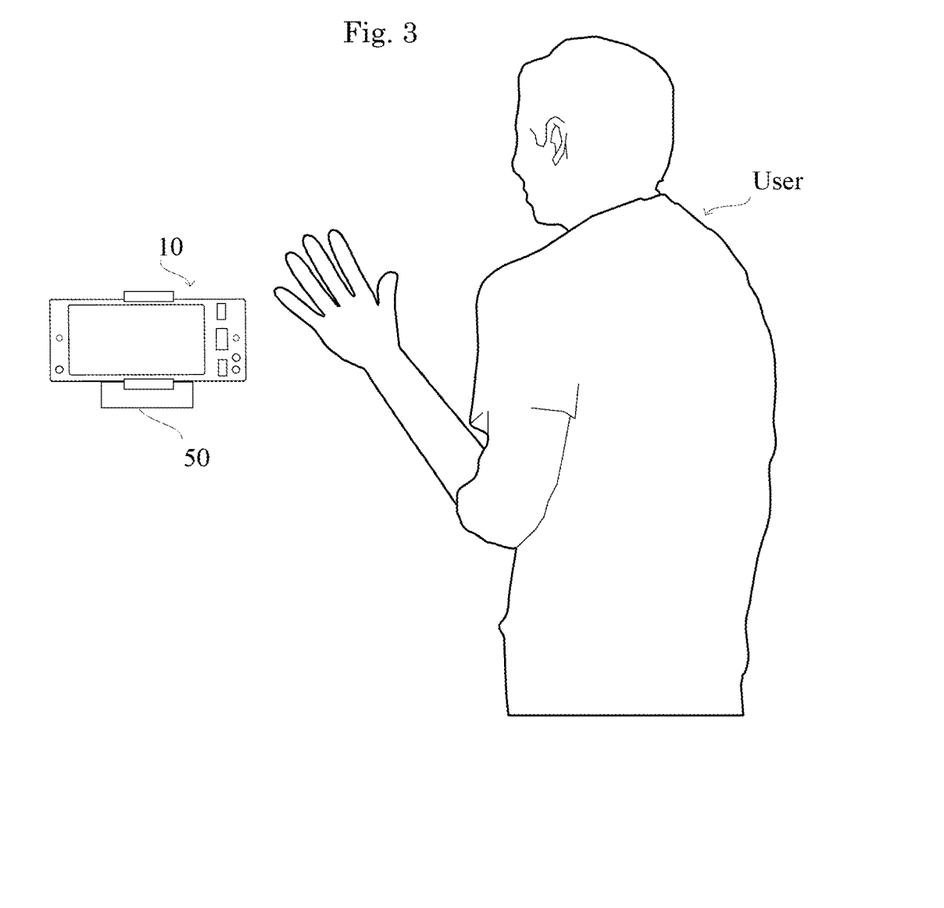
FIG. 3 is an illustration of an example user gesture performed in from of a mobile phone 10.

FIG. 3 illustrates an example of a user performing a gesture using fingers in front of the mobile phone 10. In FIG. 3, the mobile phone 10 is positioned sideways. When the mobile phone 10 is positioned sideways, the depth sensor 26 and the depth camera 28 are aligned along the horizontal direction. When the user performs a gesture while the mobile phone 10 is positioned sideways, the mobile phone 10 is able to recognize the gesture.

Figure 4:
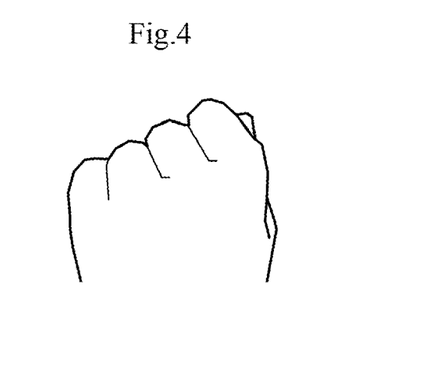
FIG. 4 is an illustration of an example user gesture of a closed hand.

In one embodiment, when a user says "gesture input", the mobile phone 10 enables gesture input. In a case where gesture input is enabled, after a user has moved his/her closed hand (see FIG. 4) closer to the mobile phone 10, the mobile phone 10 is able to receive input by an instructional gesture and by a confirmation gesture. In a description given below, a gesture performed by a user moving his/her closed hand may be a start gesture or an operation gesture. An instructional gesture may be called a first gesture or a specific gesture. A confirmation gesture may be a second gesture.

Figure 5:
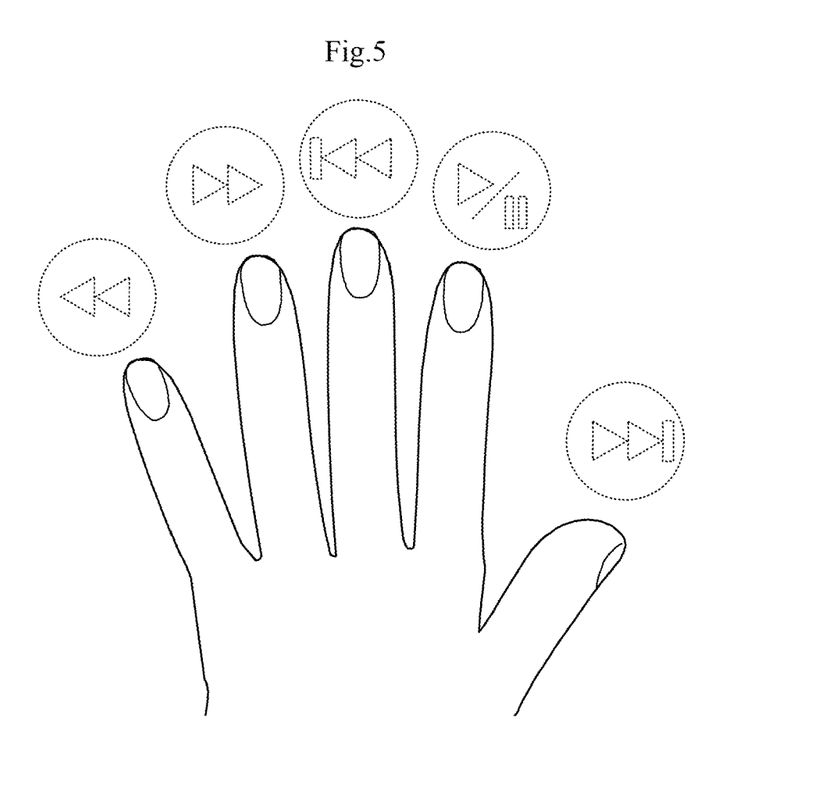
FIG. 5 is an illustration of input operations.
Figure 8:
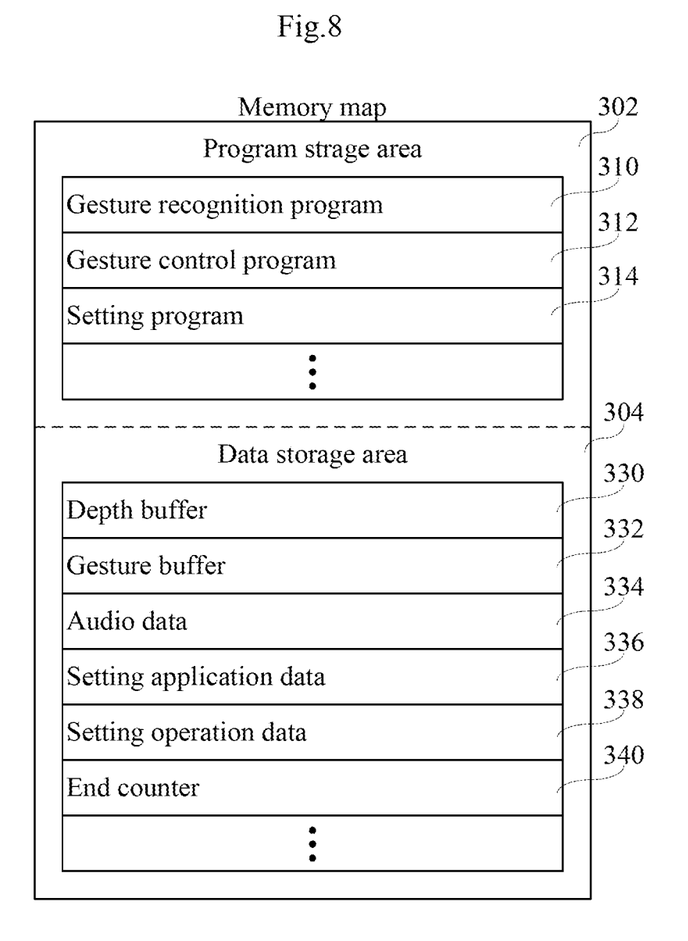
FIG. 8 is an illustration of an example memory map.

FIG. 5 is a diagram illustrating one embodiment of input operations. The RAM. 46 stores set operation data 338 (as shown in FIG. 8) that indicates input operations corresponding to the respective fingers. In one embodiment, when a user performs an instructional gesture or a confirmation gesture with a certain finger, the mobile phone 10 identifies an input operation corresponding to the finger. In one embodiment, a confirmation gesture includes bending a certain finger. When the mobile phone 10 recognizes a confirmation gesture, the mobile phone 10 communicates, to the user with a synthesized voice, the name of an input operation assigned in advance to the bent finger.

Figures 6A, 6B:
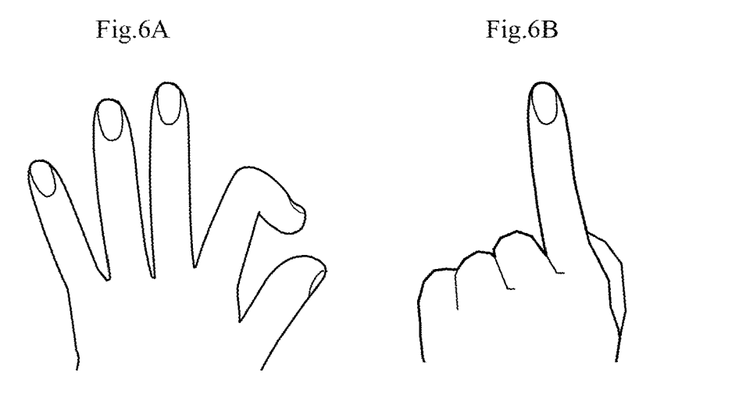

FIG. 6A is a diagram for describing one embodiment of an input operation. When the mobile phone 10 recognizes a confirmation gesture in which the index finger is bent, the mobile phone 10 identifies an input operation "play/pause" that is associated in advance with the index finger. Then, the mobile phone 10 outputs a synthesized voice for communicating "play/pause", which is the name of the identified input operation, from the speaker 18.

When the processor 30 recognizes an instructional gesture, for example, the user unbends a particular finger and bends the other fingers, the processor 30 performs a process in accordance with an input operation assigned to the unbent particular finger. For example, when the processor 30 recognizes an instructional gesture in which a user unbends the index finger and bends the other fingers, as illustrated in FIG. 6B, the mobile phone 10 performs a play or pause process.

When the processor 30 recognizes the instructional gesture, such as illustrated in FIG. 6B, while the mobile phone 10 is playing music, the processor 30 perform a process of temporarily stopping the music. On the other hand, when the processor 30 recognizes the instructional gesture, such as illustrated in FIG. 6B, while the mobile phone 10 is temporarily stopped, the processor 30 performs a process of restarting the music.

In a case where a predetermined duration has passed while the processor 30 has not recognized an instructional gesture and/or a confirmation gesture, the processor 30 returns to a gesture input disable state. While the mobile phone 10 is in a gesture input disable state, the processor 30 turns off the power of the depth sensor 26 and the depth camera 28. Therefore, in a case where the mobile phone 10 is in a low possibility of recognizing a gesture, the mobile phone 10 disables gesture input and thereby saves the power of the mobile phone 10.

As described above, the mobile phone 10 associates input operations with the respective fingers, and therefore, even if a user is unable to touch the mobile phone 10 because the user is working in a wet environment, for example, the user is able to operate the mobile phone 10 as desired by only performing a gesture using fingers. In this embodiment, a processor 30 recognizes a gesture corresponding to an input operation on an executing application. Therefore, the user is able to operate the executing application without touching the mobile phone 10.

Furthermore, the user is able to confirm input operations associated with the respective fingers by performing a confirmation gesture. Therefore, the user is able to perform an instructional gesture after the user confirmed an input operation associated with the finger. In this embodiment, the mobile phone 30 communicates an input operation associated with each finger by a synthesized voice. Therefore, the user is able to confirm an input operation associated with a certain finger without looking at the display 14 of mobile phone 10.

In one embodiment, the mobile phone 10 may be fixed by a holder that fixes the mobile phone 10 by partially or entirely holding the upper and lower side surfaces of the mobile phone 10. In one embodiment, the mobile phone 10 may be fixed by a holder that fixes the mobile phone 10 by adhering to one side of the mobile phone 10 using an adhering device, such as a suction cup, instead of a holder 50 illustrated in FIG. 3. In another embodiment, the mobile phone 10 may be fixed by a stand or the like that contacts the mobile phone 10 on at least part of one side surface or substantially the entire side surface. The mobile phone 10 also may be placed in a fixed state by, for example, placing the mobile phone 10 on a flat surface or propping the mobile phone 10 against something so that the depth sensor 26 and the depth camera 28 of the mobile phone 10 are aligned in a right-left direction relative to a user who inputs a gesture. In other words, while the mobile phone 30 is in a state for recognizing gestures, it is sufficient that the depth sensor 26 and the depth camera 28 have a predetermined positional relationship and the positions remain unchanged relative to the user during the recognizing state. The user is able to input a gesture into the mobile phone 10 that is fixed as described above.

The holder 50 that fixes the mobile phone 10 may be a dedicated product for the mobile phone 10 or may be a widely available product that is able to fix mobile phones having various forms.

In one embodiment, after the mobile phone 10 has enabled recognizing gesture input by voice, when the mobile phone 10 recognizes a gesture in which user moves his/her hand closer to the mobile phone 10, the mobile phone 10 is able to execute an application when a user performs a gesture using fingers. In a description given below, the gesture may be called a start gesture or an application gesture or a fifth gesture.

When the mobile phone 10 recognizes an application gesture, the mobile phone 10 associates applications with each finger instead of an input operation. For example, in one embodiment, the mobile phone 10 associates the e-books application with the thumb, the music player application with the index finger, and the browser application with the middle finger.

When the mobile phone 10 recognizes a confirmation gesture while the mobile phone 10 associates applications with the respective fingers as described above, the mobile phone 10 communicates an application name associated with the finger of interest from the speaker 18. When the mobile phone 10 recognizes an instructional gesture, the mobile phone 10 executes an application associated with the finger of interest. That is, when a user performs an application gesture after an enabling gesture input, the user is able to execute an application as desired.

Figures 7A, 7B:
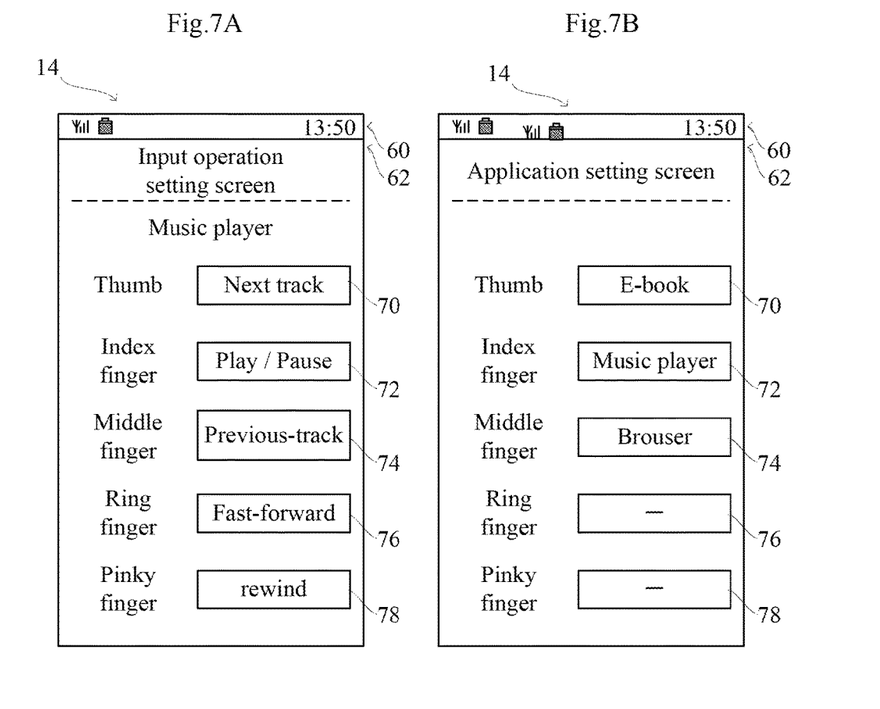

FIG. 7A illustrates an example of a setting screen for changing input operations associated with the respective fingers as desired. FIG. 7B illustrates an example of a setting screen for changing applications associated with the respective fingers as desired.

In FIG. 7A, the display area of the display 14 includes a state display area 60 and a function display area 62. The mobile phone 10 displays a state of radio reception by the antenna signal strength indicator, the remaining battery power of the secondary battery, and the time. In one embodiment, the mobile phone 10 displays an operation setting screen for a particular application, such as the music player, in the function display area 62. The operation setting screen includes a setting key 70 that corresponds to the thumb, a setting key 72 that corresponds to the index finger, a setting key 74 that corresponds to the middle finger, a setting key 76 that corresponds to the ring finger, and a setting key 78 that corresponds to the pinky finger. The mobile phone 10 associates an input operation of "next-track" with the thumb, and therefore, the mobile phone 10 indicates "next-track" on the setting key 70. Similarly, the mobile phone 10 indicates "play/pause" on the setting key 72 that corresponds to the index finger. The mobile phone 10 indicates "previous-track" on the setting key 74 that corresponds to the middle finger. The mobile phone 10 indicates "fast-forward" on the setting key 76 that corresponds to the ring finger. The mobile phone 10 indicates "rewind" on the setting key 78 that corresponds to the pinky finger.

When a user taps any of the setting keys 70 to 78, the mobile phone 10 displays a pull down menu for selecting (changing) an input operation. When the user selects a certain input operation in this state, the user is able to associate the input operation with the corresponding finger.

In FIG. 7B, the mobile phone 10 displays the application setting screen in the function display area 62. The mobile phone 10 also displays the setting keys 70 to 78 that correspond to the respective fingers on the application setting screen. In this embodiment, on the setting key 70 for the thumb that corresponds to the e-books application, the mobile phone 10 indicates "e-books". Similarly, on the setting key 72 for the index finger that corresponds to the music player application, the mobile phone 10 indicates "music player". On the setting key 74 for the middle finger that corresponds to the browser application, the mobile phone 10 indicates "browser". Note that, in this embodiment, the mobile phone 10 associates no applications with the ring finger and the pinky finger. Therefore, the mobile phone indicates "-" which represents that no application is assigned on the setting key 76 for the ring finger and the setting key 78 for the pinky finger. A user is able to associate a certain application with a certain finger by performing a tap operation on the corresponding setting key.

In this embodiment, when a user operates the mobile phone 10 to display the application setting screen on the mobile phone 10, the mobile phone 10 displays the screen illustrated in FIG. 7B on the display 14. When user operates a long tap operation on any of the setting keys 70 to 78 on the screen, the mobile phone 10 displays the operation setting screen for an application that corresponds to the setting key on the display 14. When user operates the menu key 22c or the on-hook key 22b, while the mobile phone 10 displays any of the above-described screens on display 14, the mobile phone 10 clears the screen.

Note that, also for an input operation, the mobile phone 10 "-" may indicate on the setting key. That is, a user need not associate input operations or applications with all fingers. In other words, the user may associate each necessary input operation or application with each finger.

In one embodiment, input operations for the music player may include operations of next-track, play, pause, previous-track, fast-forward, rewind, and random play. However in other embodiments, the user may associate other various input operations for the music player with fingers and/or hands.

Figure 9:
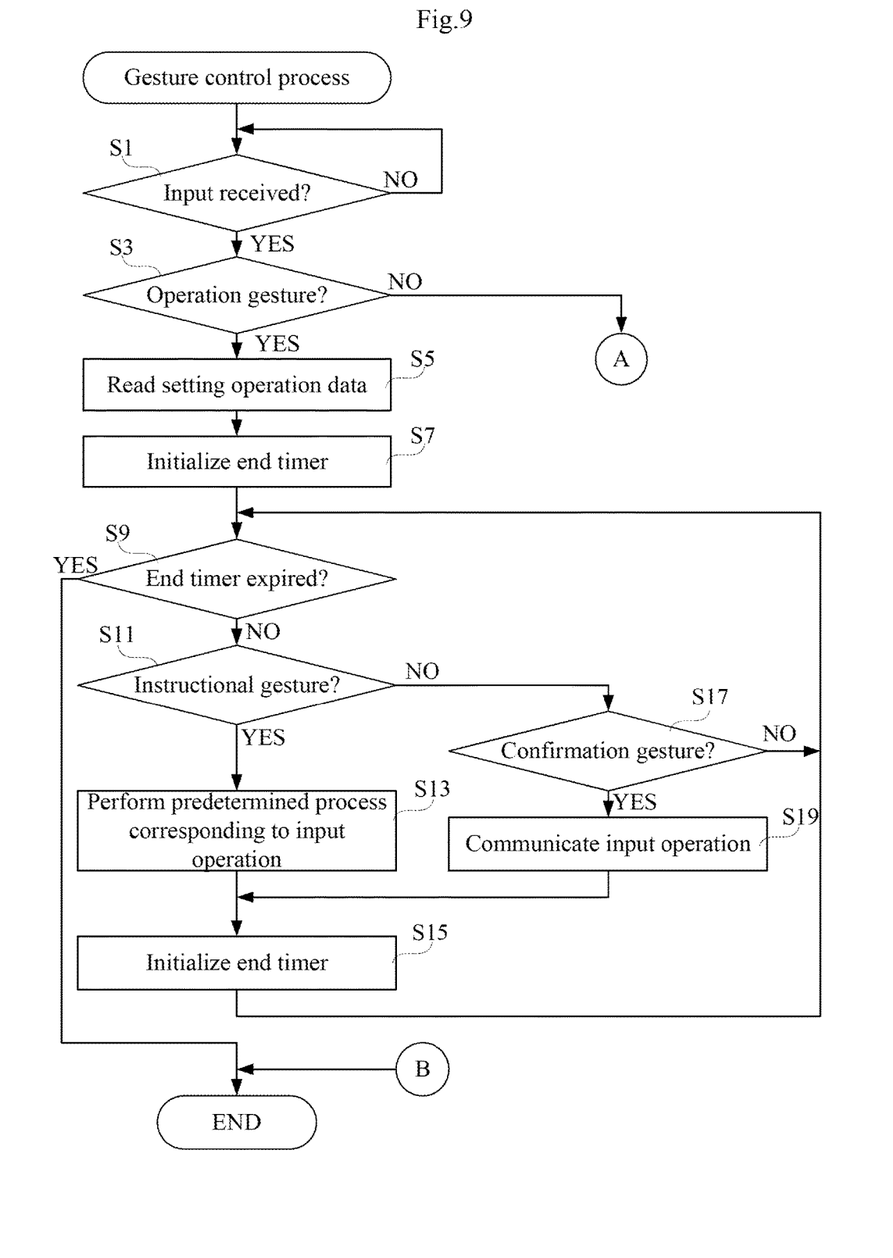
FIG. 9 is a flowchart illustrating a gesture control process.
Figure 10:
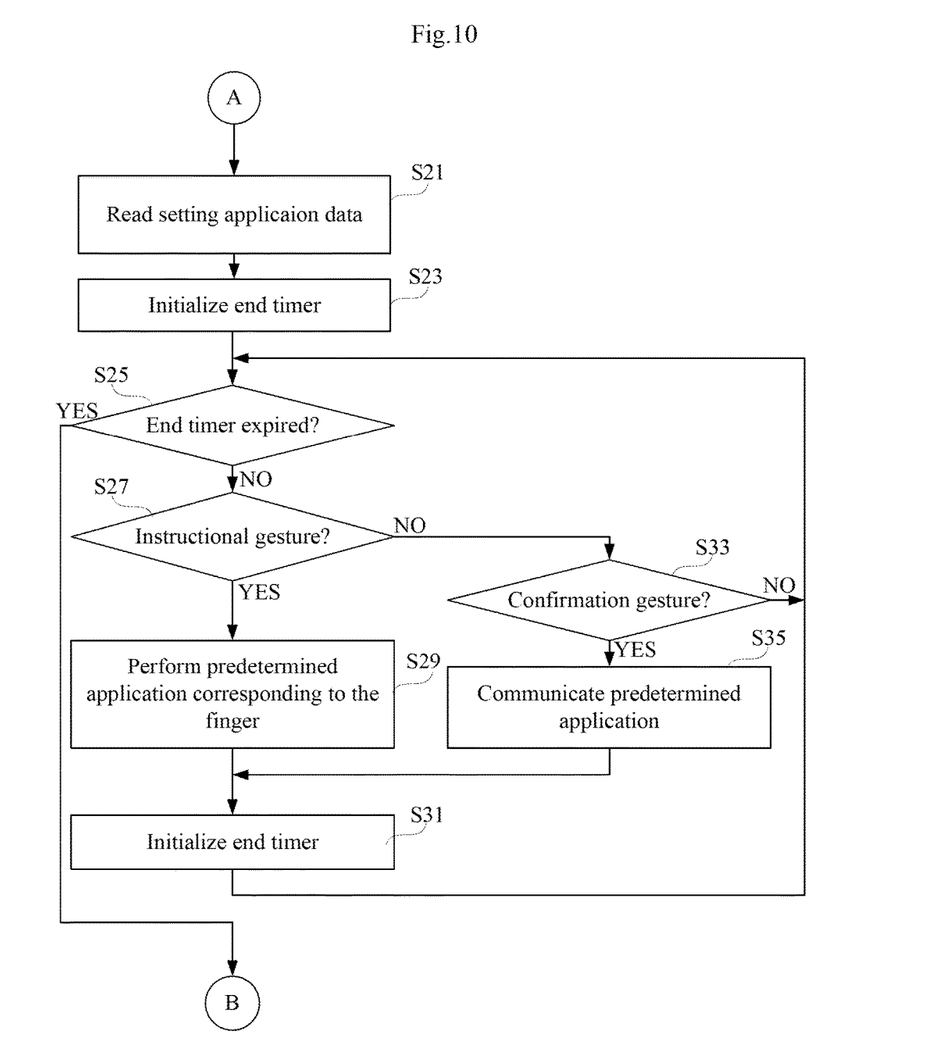
FIG. 10 is a flowchart illustrating a gesture control process.
Figure 11:
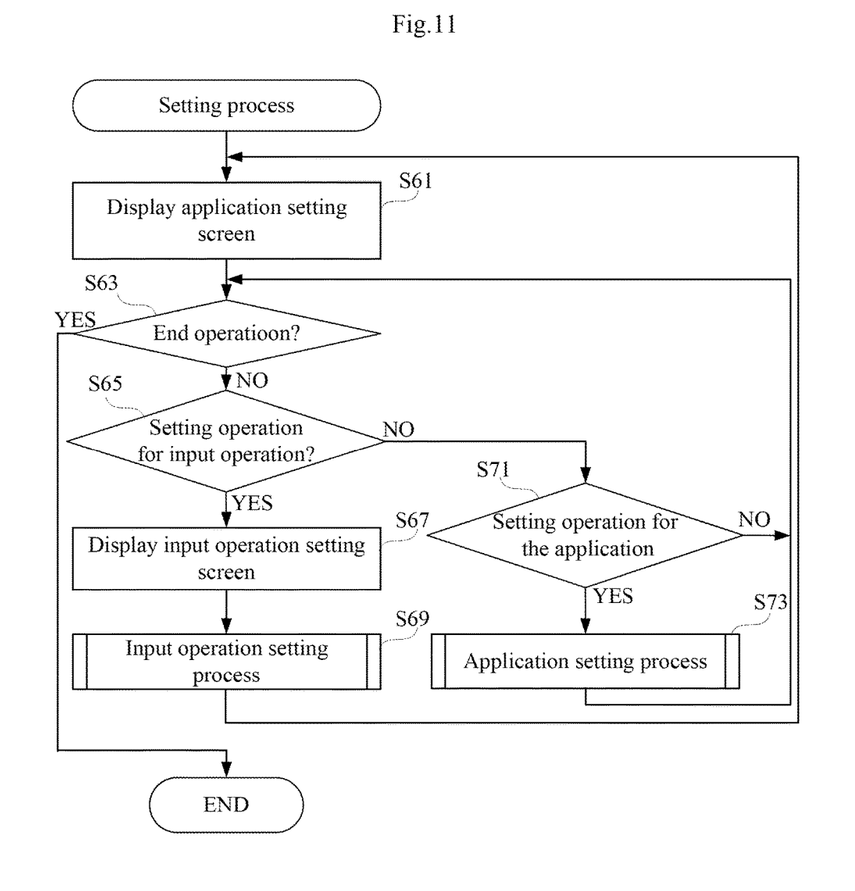
FIG. 11 is a flowchart illustrating a setting process.

FIG. 8 is a diagram for describing a memory map. The memory map includes a program storage area 302 and a data storage area 304. FIGS. 9 to 11 are diagrams for describing flowcharts of processes performed by the processor 30.

The program storage area 302 stores a part or all of program data that is set in advance in the flash memory 44 (see FIG. 2). The program storage area 302 includes a gesture recognition program 310 for recognizing gestures, a gesture control program 312 for controlling execution of applications, and a setting program 314 for changing input operations and applications associated with the respective fingers. The program storage area 302 further includes a program for executing applications, such as the e-books application, the music player application, the browser application, and the email application.

The data storage area 304 includes a depth buffer 330, a gesture buffer 332, audio data 334, set application data 336, the set operation data 338, and an end counter 340. The depth buffer 330 temporarily stores calculated depths using the depth sensor 26 and the depth camera 28. The gesture buffer 332 temporarily stores information associated with gestures recognized by the mobile phone 10.

The audio data 334 is data used for communicating, through the speaker, an input operation or an application that corresponds to the finger of interest. In one embodiment, the set application data 336 is data to indicate applications which the mobile phone 10 associates with the respective fingers on the application setting screen in FIG. 7B. The set operation data 338 is data in a table format to indicate input operations which the mobile phone 10 associates with the respective fingers. The set operation data 338 includes the result of a user selection for each application as shown in FIG. 7a.

The end counter 340 measures a predetermined duration. The end counter 340 starts counting upon initialization, and stops counting when the predetermined duration has passed since the start of counting. The end counter 340 may also be called an end timer. The data storage area 304 also stores data for displaying objects including GUIs, and flags and timers (counters) needed to execute programs.

The processor 30 performs a plurality of tasks in parallel. The processor 30 performs a gesture control process in FIGS. 9 and 10 and a setting process in FIG. 11 under control of an operating system (OS). The OS may be Windows (registered trademark) or another OS, such as an OS based on Linux (registered trademark), namely, Android (registered trademark) or iOS (registered trademark).

FIG. 9 is a flowchart of the gesture control process. Note that, the processor 30 performs a gesture recognition process for recognizing gestures in parallel and separately from the gesture control process. A process for recognizing gestures is already available and is not intrinsic to the present invention. Therefore, illustration and description thereof is not described further.

The processor 30 starts the gesture control process when the processor 30 has enabled gesture input by voice input, for example. In step S1, the processor 30 determines whether the processor 30 has started to enable gesture input. That is, the processor 30 determines whether the processor 30 has recognized any of the start gestures, namely, the operation gesture or the application gesture. If the result of determination in step S1 is "No", that is, if the processor 30 has not recognized a start gesture, the processor 30 repeats the process in step S1.

On the other hand, if the result of the determination in step S1 is "Yes", that is, if the processor 30 has recognized a start gesture, the processor 30 determines in step S3 whether the start gesture is the operation gesture. For example, the processor 30 determines whether the start gesture is the operation gesture in which a user moves a closed hand closer to the mobile phone 10. The processor 30 determines whether information about the gesture that is stored in the gesture buffer 332 corresponds to the operation gesture. If the result of determination in step S3 is "No", that is, if the mobile phone 10 has recognized the application gesture as the start gesture, the flow proceeds to step S21 in FIG. 10, and the processor 30 performs the process in step S21.

If the result of determination in step S3 is "Yes", that is, if the processor 30 has recognized the operation gesture, the processor 30 reads the set operation data 338 in step S5. That is, the processor 30 reads the table that includes the application settings corresponding to the application that is currently executing. The processor 30 reads the table in order to perform an operation based on an instructional gesture or a confirmation gesture. Next, the processor 30 initializes the end timer in step S7. That is, processor 30 starts measurement of the predetermined duration by the end timer.

Next, the processor 30 determines in step S9 whether the end timer has expired. That is, the processor 30 determines whether the predetermined duration has passed without recognizing any gesture. If the result of determination in step S9 is "No", that is, if the end timer has not expired, the processor 30 determines whether the recognized gesture is an instructional gesture in step S11. That is, the processor 30 determines whether the processor 30 has recognized an instructional gesture.

If the result of determination in step S11 is "Yes", that is, if the processor 30 has recognized the instructional gesture, for example, the processor 30 performs a process in accordance with an input operation that corresponds to the unbent index finger in step S13. For example, the instructional gesture is the index finger that is left unbent and the other fingers that are bent, such as illustrated in FIG. 6B. For example, when the processor 30 has recognized the instructional gesture described above, the processor 30 identifies an input operation that corresponds to the index finger on the basis of the table. The table includes the settings for the currently executing application. In one embodiment, the input operation "play/pause" corresponds to the index finger as illustrated in FIG. 7A. Therefore, if the mobile phone 10 is playing music, the processor 30 performs a process of temporarily stopping the music in accordance with the input operation of "play/pause". As a result, the processor 30 temporarily stops the playing music. Note that the processor 30 that performs the process in step S13 functions as acontrol module.

Next, the processor 30 initializes the end timer in step S15. That is, the processor 30 recognizes the instructional gesture. Therefore, the end timer restarts measurement of the predetermined duration. After step S15, the flow returns to step S9, and the processor 30 performs the process in step S9.

If the result of determination in step S11 is "No", that is, if the processor 30 has recognized an instructional gesture, the processor 30 determines whether the processor 30 has recognizes a confirmation gesture in step S17. That is, the processor 30 determines whether the processor 30 has recognized a confirmation gesture. If the result of determination in step S17 is "No", that is, if the processor recognizes neither an instructional gesture nor a confirmation gesture, the flow returns to step S9, and the processor 30 performs the process in step S9. On the other hand, if the result of determination in step S17 is "Yes", that is, if the processor 30 recognizes the confirmation gesture in which the index finger is bent as illustrated in FIG. 6A, for example, the processor 30 communicates an input operation that corresponds to the bent index finger in step S19.

For example, when the processor 30 has recognized the confirmation gesture described above, the processor 30 identifies an input operation that corresponds to the index finger on the basis of the table. The table includes the settings for the currently executing application. Then, the processor reads the audio data 334, and synthesized voice for communicating the name of the input operation "play/pause". The processor outputs the synthesized voice from the speaker 18. After step S19, the processor 30 performs the process in step S15, and thereafter the flow returns to step S9.

If the result of determination in step S9 is "Yes", that is, if the predetermined duration has expired without recognizing any gesture, the processor 30 ends the gesture control process.

If the result of determination in step S3 is "No", that is, if the processor 10 recognizes the application gesture in which user moves an open hand closer to the mobile phone 10 as the start gesture, the processor 30 reads the set application data 336 in step S21 in FIG. 10. The processor 10 reads the set application data 336 in order to identify an application associated with each finger. Next, the processor 30 initializes the end timer in step S23, as in step S7.

Next, the processor 30 determines in step S25 whether the end timer has expired, as in step S9. If the result of determination in step S25 is "No", that is, if the end timer has not expired, the processor 30 determines in step S27 whether the processor 30 recognizes an instructional gesture, as in step S11. If the result of determination in step S27 is "Yes", that is, if the instructional gesture made by the user, as illustrated in FIG. 6B, for example, the processor 30 executes an application that corresponds to the finger of interest in step S29. For example, if the processor 30 recognizes the instructional gesture in which the user leaves the index finger unbent and bends the other fingers, the processor 30 identifies an application that corresponds to the index finger, and executes the application. Next, the processor 30 initializes the end timer in step S31, as in step S15, and the flow returns to step S25.

If the result of determination in step S27 is "No", that is, if the processor 30 has not recognized an instructional gesture, the processor 30 determines whether the processor 30 is a confirmation gesture in step S33, as in step S17. If the result of determination in step S33 is "No", that is, if the processor 30 has not recognized a confirmation gesture, the flow returns to step S25, and the processor 30 performs the process in step S25. On the other hand, if the result of determination in step S33 is "Yes", that is, if the processor 30 recognizes the confirmation gesture which the user makes the fingers into the state illustrated in FIG. 6A, the processor 30 communicates an application that corresponds to the finger of interest in step S35. Then, the processor 30 performs the process in step S31, and the flow returns to step S25.

If the result of determination in step S25 is "Yes", that is, if the predetermined duration has passed without recognizing any gesture, the processor 30 ends the gesture control process. When the gesture control process ends, gesture input is disabled.

Note that, in one embodiment, the processor 30 may further recognize an end gesture, such as a hand-waving gesture. The processor 30 may end the gesture control process when the processor 30 has recognized the end gesture. In other embodiments, the gesture control process may end only when the processor 30 has recognized the end gesture or may end when one or more of pre-determined conditions are met, that is for example, recognition of the end gesture and the expiration of the end timer.

FIG. 11 is a flowchart of the setting process. When an operation of displaying the application setting screen has been performed, for example, the setting process starts. In other words, when the processor 30 has received an operation of displaying the application setting screen, for example, the processor 30 starts the setting process. The processor 30 displays the application setting screen in step S61. For example, the processor 30 displays the application setting screen illustrated in FIG. 7B on the display 14.

Next, the processor 30 determines in step S63 whether an end operation has been performed. In other words, the processor 30 determines in step S63 whether the processor 30 has received an end operation. That is, the processor 30 determines whether the on-hook key 22b or the menu key 22c has been operated as an operation for ending the setting process. In other words, the processor 30 determines whether the processor 30 has received an operation on the on-hook key 22b or the menu key 22c for ending the setting process. If the result of determination in step S63 is "No", that is, if an operation for ending the setting operation has not been performed, the processor 30 determines in step S65 whether the performed operation is a setting operation of setting an input operation. In the other words, if the processor has not received an operation for ending the setting operation, the processor 30 determines in step S65 whether the operation is a setting operation of setting an input operation. For example, it is determined whether a long tap operation has been performed on any of the setting keys 70 to 78 on the application setting screen. In the other words, for example, the processor 30 determines whether the processor 30 has received a long tap operation on any of setting keys 70 to 78 on the application setting screen.

If the result of determination in step S65 is "Yes", that is, if a long tap operation has been performed on the setting key 72 on which "music player" is indicated, for example, the processor 30 displays the input operation setting screen in step S67. In the other words, if the processor 30 has received a long tap operation on the setting key 72, for example, the processor 30 displays the input operation setting screen in step S67. The input operation setting screen for the music player illustrated in FIG. 7A is displayed, for example. In the other words, the processor 30 displays an input operation setting screen on the display 14 for the music player. An example input operation setting screen is shown in FIG. 7A.

Next, the processor 30 performs an input operation setting process in step S69. For example, when an input operation setting process is performed, an operation of changing an input operation that corresponds to each finger or the like is accepted. In the other words, when the processor 30 has performed an input operation setting process, the processor 30 accepts an operation of changing an input operation that corresponds to each finger or the like. When the processor 30 ends the operation setting process, the flow returns to step S61, and the processor 30 performs the process in step S61. The processor 30 that performs the process in step S69 functions as a change unit.

On the other hand, if the result of determination in step S65 is "No", that is, if a setting operation of setting an input operation has not been performed, the processor 30 determines in step S71 whether a setting operation of setting an application has been performed. In other words, if the processor 30 has not performed a setting operation of setting an input operation, the processor 30 determines in step S71 whether a setting operation of setting an application has been performed. For example, it is determined whether a tap operation has been performed on any of the setting keys 70 to 78 on the application setting screen. In other words, the processor 30 determines whether the processor 30 has received a tap operation on any of the setting keys 70 to 78 on the application setting screen.

If the result of determination in step S71 is "No", that is, if the processor 30 has not performed a setting operation of setting an application, the flow returns to step S63, and the processor 30 performs the process in step S63. On the other hand, if the result of determination in step S71 is "Yes", that is, if the processor 30 has performed a setting operation of setting an application, the processor 30 performs an application setting process in step S73. For example, when an application setting process is performed, the application is associated with the finger of interest in accordance with the setting operation of setting the application. In other words, when the processor 30 has performed an application setting process, the processor 30 associates the application with the finger of interest in accordance with the setting operation of setting the application. After step S73, the flow returns to step S63, and the processor 30 performs the process of step S63.

If the result of determination in step S63 is "Yes", that is, if the on-hook key 22b has been operated, for example, the processor 30 ends the setting process. In other words, if the processor 30 has received the operation on the on-hook key 22b, for example, the processor 30 ends the setting process.

In one embodiment, the mobile phone 10 may recognize, when a user opens his/her hand as illustrated in FIG. 5 after performing a start gesture, the fingers and may assign input operations associated with the respective fingers to the recognized fingers respectively. In this example embodiment as shown in FIG. 5, when the user's left fingers are recognized, the input operation of next-track is assigned to a finger that is recognized as the thumb, the input operation of play/pause is assigned to a finger that is recognized as the index finger, the input operation of previous-track is assigned to a finger that is recognized as the middle finger, the input operation of fast-forward is assigned to a finger that is recognized as the ring finger, and the input operation of rewind is assigned to a finger that is recognized as the pinky finger. In the other words, when the processor 30 recognizes the user's left fingers, the processor assigns the input operation of next-track to the thumb, play/pause to the index finger, previous-track to the middle finger, fast-forward to the ring finger, and rewind to the pinky finger, for example, as illustrated in FIG. 5.

In one embodiment, in the gesture control process, a process of assigning an input operation to each finger is performed after the set operation data 338 has been read in step S5. In one embodiment, in the gesture control process, the processor 30 performs a process to assign an input operation to each finger after the processor 30 has read the set operation data 338 in step S5 of FIG. 9. The processor 30 that performs the process functions as an assigning unit. In one embodiment, input operations associated with the respective fingers are assigned to recognized fingers respectively. In other words, the processor 30 assigns input operations to the respective fingers. Assignment of an input operation is performed after a start gesture has been recognized to thereby make it possible not to assign an input operation to an object that is not recognized as a finger. In other words, the processor 30 performs assignment of an input operation after the processor 30 has recognized a start gesture. In doing so, the processor 30 will not assign an input operation to an object that the processor 30 does not recognize as a finger. Specifically, by assigning input operations to recognized fingers, it is also possible to display input operations assigned to the respective fingers on the display 14. In the other words, the processor 30 also displays input operations assigned to the respective fingers on the display 14. In this embodiment, the user is able to easily know the input operations which the processor 30 has assigned to the fingers.

In one embodiment, the processor 30 may display an input operation or an application that corresponds to a finger used in a confirmation gesture, or input operations or applications that correspond to all fingers on the display 14. The processor 30 may display input operations or applications that correspond to all fingers on the display 14 during a period in which the processor 30 enables gesture input. In one embodiment, the processor 30 may communicate an input operation or an application that corresponds to each finger by a combination of synthesizing voice from the speaker 18 and a corresponding display on the display 14.

In one embodiment, the processor 30 may communicate an event of a gesture to a user by synthesizing voice from the speaker 18, by light from a light emitting diode (LED) or the like, or by the combination of the synthesizing voice and the light.

The processor 30 may associate applications, such as television viewing, route guidance, and the like with fingers. The processor 30 may associate input operations for these applications with the respective fingers.

In one embodiment, an instructional gesture or a confirmation gesture may be a gesture in which a certain finger is moved a plurality of times.

In one embodiment, the processor 30 recognizes gestures by a proximity sensor that uses changes in the capacitance or the like or an ultrasonic sensor, instead of using infrared.

In one embodiment, a proximity sensor may be provided on the front of the mobile phone 10, and, when an approaching finger is detected by the proximity sensor, gesture input may be enabled. In the other words, a proximity sensor may be located on the same surface as display 14. When the mobile phone 10 detects an approaching finger by the proximity sensor, the processor 30 may enable gesture input.

In one embodiment, an instructional gesture or a confirmation gesture may be recognized without a need to perform a start gesture in advance. In the other words, the processor 30 may recognize an instructional gesture or a confirmation gesture without recognizing a start gesture in advance.

In one embodiment, the processor 30 may always enable gesture input. Furthermore, gesture input may be enabled in a state where power is directly supplied to the mobile phone 10 from a power source. In the other words, the processor 30 may enable gesture input in a state where a power source directly supplies power to the mobile phone 10.

In one embodiment, the processor 30 may associate input operations for the digital camera, such as clicking the shutter, with the respective fingers.

The processor 30 may perform a process based on an input operation by right and left fingers. For example, in executing a plurality of applications in parallel, user may assign an application to a left finger and an input operation to a right finger. The user is able to perform input operation for the executing application as desired.

In one embodiment, in a case where a user is to switch an application while performing an input operation by fingers of one hand, the user may move the hand to perform the input operation in a direction, for example, to thereby switch the application.

In one embodiment, the mobile phone 10 may store the programs and data described in FIG. 8 in a hard disk drive (HDD) of a server, and the mobile phone 10 may distribute the data over a network. The mobile phone 10 may store the plurality of programs on a storage medium, namely, an optical disc, such as a compact disc (CD), a digital versatile disc (DVD), or a Blu-ray disc (BD), a Universal Serial Bus (USB) memory, or a memory card. These storage mediums may be sold or distributed. When a user installs the plurality of programs that the mobile phone 10 has downloaded from the above-described server or loaded from the above-described storage medium on a mobile phone having a configuration similar to any of the embodiments described herein, similar effects are attained. In the other words, when a user installs the plurality of programs on a mobile phone having a configuration the same as the mobile phone 10 in any of the embodiments described herein, the mobile phone operates the plurality of programs and attains similar effects similar to those described with reference to FIGS. 1 to 11.

The invention claimed is:

1. An electronic device comprising:
   a memory configured to store:
      a first gesture indicated by a first configuration of one or more fingers of a user;
      a second gesture indicated by a second configuration of one or more fingers, wherein the second configuration is different from the first configuration;
      a first process to execute an application; and
      a second process to notify the user of information related to an identity of the first process prior to performing the first process;
   a recognition unit configured to recognize the first gesture or the second gesture; and
   at least one processor configured to perform:
      the first process when the first gesture is recognized; and
      the second process when the second gesture is recognized prior to recognizing the first gesture.

2. The electronic device according to claim 1, wherein the application includes a music player application; and
   the first process includes playing music or pausing the playing of the music.

3. The electronic device according to claim 1, wherein the application includes a television viewing application.

4. The electronic device according to claim 1, wherein
   the memory further stores a third gesture indicated by the one or more fingers, wherein the at least one processor is configured to perform a third process when the recognition unit recognizes the third gesture.

5. The electronic device according to claim 4, further comprising:
   a microphone configured to receive a voice; and
   wherein the recognition unit is further configured to start the recognition of the first or second gesture when the microphone receives the voice.

6. The electronic device according to claim 1, wherein the memory further stores a third gesture indicated by the one or more fingers, wherein the at least one processor is configured to perform a third process when the recognition unit recognizes the third gesture.

7. The electronic device according to claim 6, further comprising:
a microphone configured to receive a voice; and
wherein the recognition unit is further configured to start the recognition of the first or second gesture when the microphone receives the voice.

8. The electronic device according, to claim 1, wherein
the memory further stores a fourth gesture indicated by the one or more fingers; and
wherein the recognition unit is further configured to end the recognition of the first or second gesture when the recognition unit recognizes the fourth gesture.

9. The electronic device according to claim 8, further comprising:
a microphone configured to receive a voice; and
wherein the recognition unit is further configured to start the recognition of the first or second gesture when the microphone receives the voice.

10. The electronic device according to claim 1, wherein
the memory further stores a fourth gesture indicated by the one or more fingers; and
wherein the recognition unit is further configured to end the recognition of the first or second gesture when the recognition unit recognizes the fourth gesture.

11. The electronic device according to claim 1, further comprising:
a microphone configured to receive a voice; and
wherein the recognition unit is further configured to start the recognition of the first or second gesture when the microphone receives the voice.

12. The electronic device according to claim 1, further comprising:
a microphone configured to receive a voice; and
wherein the recognition unit is further configured to start the recognition of the first or second gesture when the microphone receives the voice.

13. A non-transitory computer-readable storage medium storing a program for recognizing a movement, the program comprising instructions of:
recognizing a first or second gesture indicated by one or more fingers of a user, wherein the first gesture comprises a first configuration of one or more fingers of the user and the second gesture comprises a second configuration of one or more fingers of the user, the first configuration being different from the second configuration;
performing a first process of executing an application when the first gesture is recognized; and
performing a second process of notifying the user of information related to an identity of the first process when the second gesture is recognized prior to recognizing the first gesture.

14. A method for controlling a mobile electronic device, the method comprising:
recognizing a first or second gesture indicated by one or more fingers of a user, wherein the first gesture comprises a first configuration of one or more fingers of the user and the second gesture comprises a second configuration of one or more fingers of the user, the first configuration being different from the second configuration
performing a first process of executing an application when the first gesture is recognized; and
performing a second process of notifying the user of information related to an identity of the first process when the second gesture is recognized prior to recognizing the first gesture.

* * * * *